UNITED STATES PATENT OFFICE.

ARTHUR B. FOSTER, OF WASHINGTON, DISTRICT OF COLUMBIA.

PROCESS OF OBTAINING ALCOHOL.

1,320,043. Specification of Letters Patent. Patented Oct. 28, 1919.

No Drawing. Application filed February 15, 1913. Serial No. 748,581.

*To all whom it may concern:*

Be it known that I, ARTHUR B. FOSTER, a citizen of the United States, residing at Washington, D. C., have invented new and useful Improvements in Processes of Obtaining Alcohol, of which the following is a specification.

This invention relates to the production of alcohol from the waste liquor of sulfite pulp mills, that is liquor resulting from the process of boiling wood chips with a solution of calcium bisulfite, which operation is almost invariably carried on under pressure, for the production of wood pulp, for paper making.

This liquor is well known to contain a small amount of fermentable sugars, (usually about 1 to $1\frac{1}{2}\%$) which sugars when fermented by yeast produce alcohol, which can be recovered therefrom by distillation. Several processes have been proposed for converting these sugary materials into alcohol.

The object of the present invention is to increase the yield of alcohol from a given amount of the waste liquor, without materially increasing the cost of producing the alcohol therefrom The waste liquor, as blown from the digester, after the separation of the fiber, contains besides the sugars above referred to, more or less free $SO_2$, some unchanged $Ca(HSO_3)_2$, and a considerable amount of what is termed "calcium lignone-sulfonate," as well as other sulfo derivatives which contain loosely combined sulfur acids, in combination with bodies resembling carbo-hydrates.

These two last mentioned bodies are believed to contain the nucleus of a body which is somewhat similar to cellulose.

In carrying out my process, I preferably proceed in the following manner. The liquor may first be aerated, if desired, by blowing a current of air therethrough, or by causing a shower of the liquor to descend through a tower up which a current of air (hot or cold) is passing, to drive out as much of the free $SO_2$ as possible. This step is however optional.

Next I add an acid, preferably sulfuric acid and acid phosphate of calcium (ordinary superphosphate), or a mixture of sulfuric and phosphoric acid, and maintain the liquor at or near its boiling point for a period of from one to two hours or longer. During all or a part of this time a current of air may be blown or drawn through the liquor, to remove $SO_2$, as rapidly as possible therefrom, and the removal of the $SO_2$ in solution hastens the formation of free $SO_2$.

The amount of sulfuric acid to be added may be about .2 or .3% of the weight of the liquor, and the amount of phosphoric acid may be $\frac{1}{8}\%$. This drives off $SO_2$ from the liquor, which may be recovered, by being converted into calcium bisulfite or monosulfite, for reuse in treating more wood. The boiling also exercises another and more important function, that is, it converts these bodies above referred to, at least in part, into fermentable sugars.

Before or during the boiling with acid, I may add nitrogenous matter containing starch, such as cotton seed meal or flax seed meal (or the press cakes of cotton and flax seed) in which case the nitrogen therein is partly dissolved, and the starches therein are converted into sugars which are fermentable.

I next, preferably aerate the liquor unless the same has been aerated during the step of boiling with acid, by the method above described, or otherwise, which not only removes $SO_2$ therefrom but also cools the liquor somewhat.

After this I neutralize, at least in part, the free acids of the solution, by calcium carbonate, in such form as oyster or clam shells, marl, bone ash, if these are available, or by other calcium carbonate or lime or slaked lime. Shells if available, are especially suitable as they contain more or less phosphatic and nitrogenous bodies which go into solution and furnish nutrient material for the yeast, to be added later. Marl and bone ash used together also furnish both nitrogen and phosphoric acid, which are valuable yeast nutrients.

The liquor may still be too strongly acid, in which case a small amount of ammonia water may be added, to leave the liquor but very faintly acid. Lime may be used for this if desired. The total acidity at this point might be equivalent to .02% $H_2SO_4$.

The liquor may or may not be subjected to filtration, decantation, centrifugation or other equivalent step to separate the sludge of insoluble material, and at this stage, if not sufficiently rich in nitrogen I preferably add "tank water" which is the liquid remaining from rendering garbage, fish, meat, carcasses of animals, or other material for the recovery of fat therefrom; or blood, or a material rich in nitrogen such as leather, horns, hoofs, etc., boiled up and dissolved in caustic alkalis. Sour milk or skimmed milk may also be used. If the material is deficient in phosphates I may add soluble phosphates, such as sodium, potassium or ammonium phosphate, or superphosphate, provided the latter does not contain too much free acid, in which case it should be partially neutralized with lime or other alkali (including ammonia).

A small amount of magnesium sulfate or of manganese sulfate may also be added at this stage to increase the acitivity of the yeast.

After these additions (if necessary or advisable) I add the yeast, then ferment the liquor, and distil off the alcohol in the usual or any approved manner.

What I claim is:—

1. A process of making alcohol from sulfite waste liquor, which comprises boiling the same with an acid less volatile than sulfurous acid, neutralizing at least a part of the acidity therein and fermenting to produce alcohol.

2. A process of making alcohol from sulfite waste liquor, which comprises boiling the same with an acid less volatile than sulfurous acid, aerating, neutralizing at least a part of the acidity therein, and fermenting to produce alcohol.

3. A process of making alcohol from sulfite waste liquor, which comprises boiling the same with an acid less volatile than sulfurous acid, neutralizing at least a part of the acidity therein with shells, and fermenting to produce alcohol.

4. A process of making alcohol from sulfite waste liquor, which comprises boiling the same with an acid less volatile than sulfurous acid, neutralizing at least a part of the acidity therein, adding nitrogenous matters capable of serving as yeast nutrients and fermenting to produce alcohol.

5. A process of making alcohol from sulfite waste liquor, which comprises boiling the same with a mixture of acids including phosphoric acid, neutralizing at least a part of the acidity therein, and fermenting to produce alcohol.

6. A process of obtaining alcohol from waste sulfite liquor which comprises boiling the same with sulfuric and phosphoric acids, in the presence of starchy, nitrogenous vegetable matter, aerating the liquid; neutralizing at least a part of the acidity therein by the addition of shells; and thereafter fermenting the liquor.

7. A process of producing alcohol from the waste liquor of the sulfite cellulose process, as discharged from the digester, and after separation of the pulp therefrom, by adding thereto a small percentage of sulfuric acid, heating the liquor to boiling, and maintaining a boiling temperature for a time sufficient to convert a material part of the nonfermentable carbohydrate material therein into fermentable sugars, aerating the mass while still hot, recovering the sulfur dioxid liberated during such heating and aerating steps, adding to the acid liquor, shell material containing neutralizing material and nutrient material, to partly neutralize the acidity of the liquor, adding more powerful alkali, to still further neutralize the acidity, but in such amount as to leave the liquor still slightly acid, thereafter pitching, fermenting, and distilling off the alcohol.

Signed at Washington, D. C., this 15th day of February, 1913.

ARTHUR B. FOSTER.

Witnesses:
M. D. WATERS,
HENRY C. FINKEL.